Dec. 21, 1948.  E. H. SCHMIDT  2,456,738
VARIABLE SPEED DEVICE
Filed Aug. 22, 1947  3 Sheets-Sheet 1
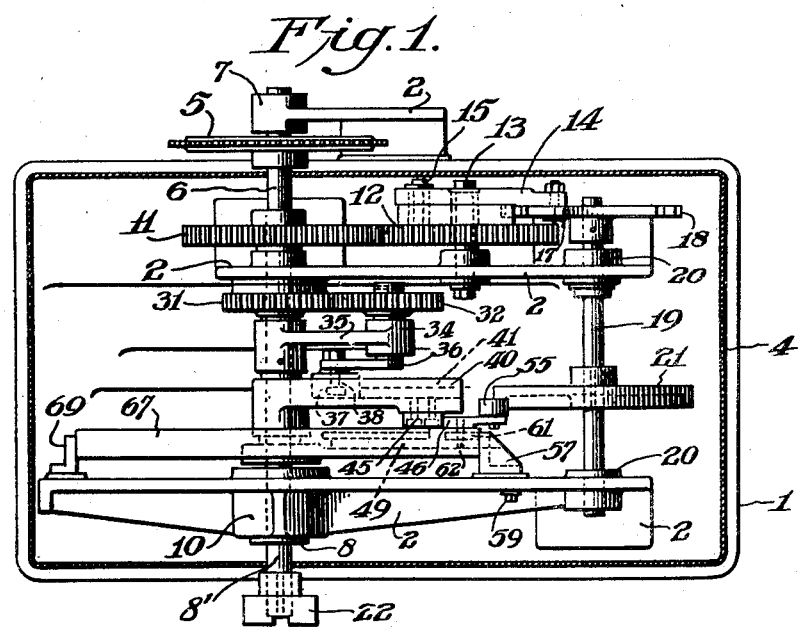
INVENTOR.
Edgar H. Schmidt
BY
Walter C. Wheeler
ATTORNEY Dec. 21, 1948.  E. H. SCHMIDT  2,456,738
VARIABLE SPEED DEVICE
Filed Aug. 22, 1947  3 Sheets-Sheet 2
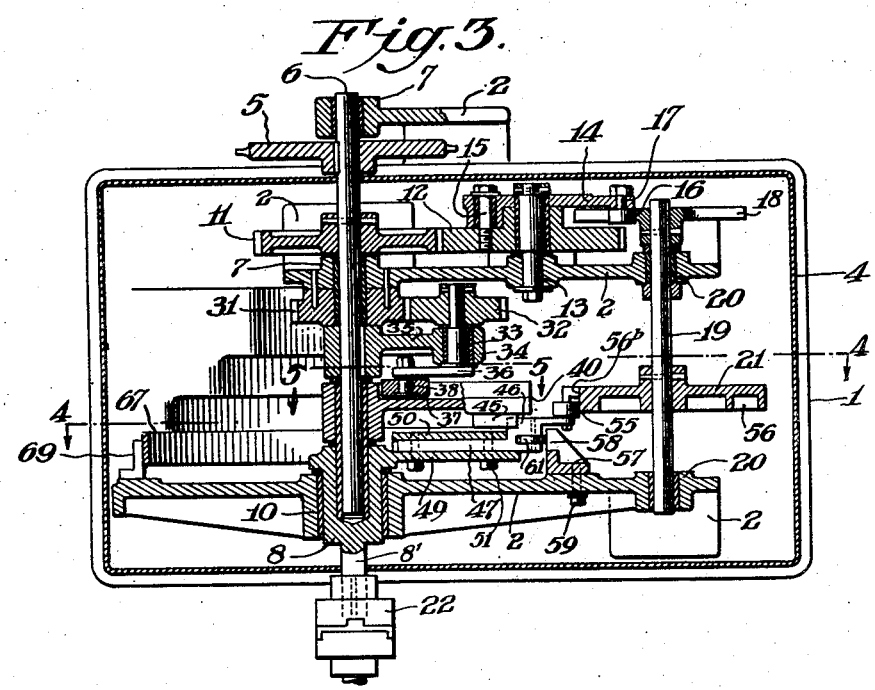
INVENTOR.
Edgar H. Schmidt
BY
Walter C. Wheeler
ATTORNEY Dec. 21, 1948.  E. H. SCHMIDT  2,456,738
VARIABLE SPEED DEVICE
Filed Aug. 22, 1947  3 Sheets-Sheet 3
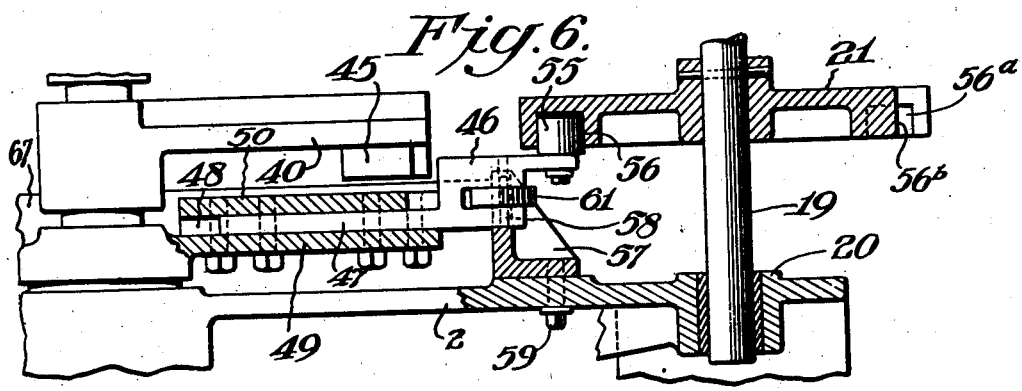
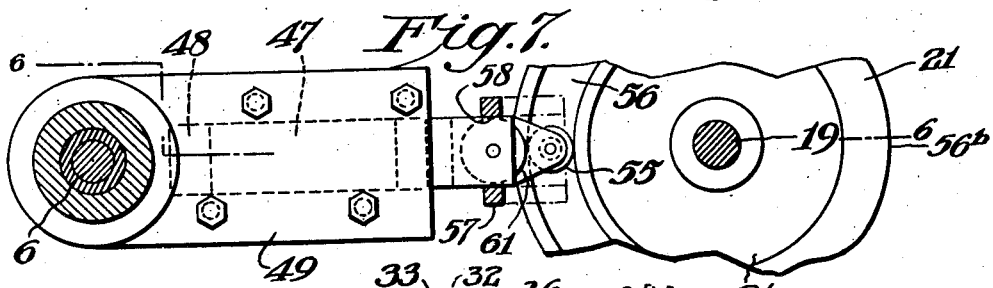
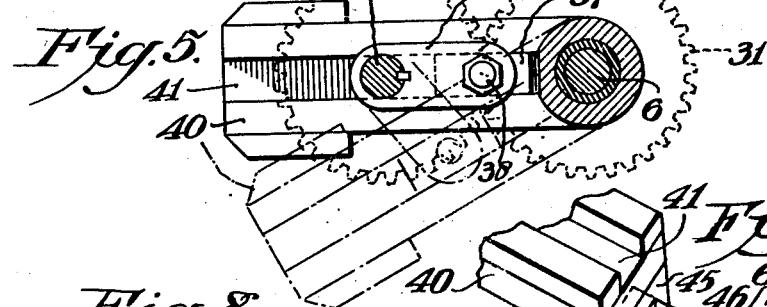
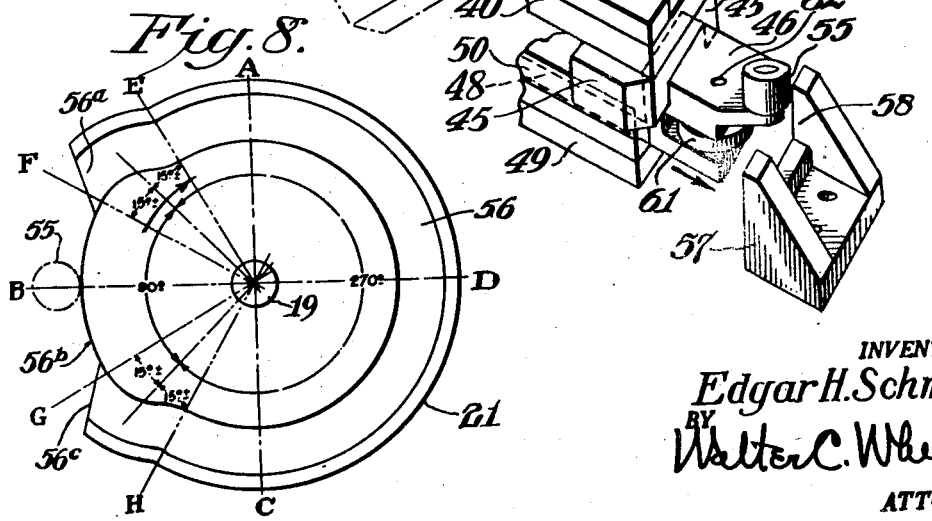
INVENTOR.
Edgar H. Schmidt
BY Walter C. Wheeler
ATTORNEY Patented Dec. 21, 1948

2,456,738

UNITED STATES PATENT OFFICE 2,456,738

VARIABLE-SPEED DEVICE

Edgar H. Schmidt, Wilmington, Del., assignor to E. I. du Pont de Nemours & Company, Wilmington, Del., a corporation of Delaware Application August 22, 1947, Serial No. 770,093

7 Claims. (Cl. 74—394)

This invention relates to novel devices for translating a constant speed input to a controlled variable speed output for driving attached mechanism, such as indexing mechanism; and particularly to the combination of a modified planetary drive and an interconnected clutch device for periodically connecting and disconnecting the planetary drive to the output or driven member.

In the operation of devices which translate constant speed to an interrupted movement or variable speed where a connection is made and broken between the driving and driven members, a common defect comprises a too sudden pickup of the driven member which may have relatively great inertia and another defect comprises a lack of ample time for engaging and disengaging the clutch or connecting member.

The present device comprises means for changing a constant speed input to an output which is cycloidal in character. The device comprises a planetary device which is modified for providing a short period amounting to an average zero power output, and means are provided for operating a connection, clutch or latch between the driven member of the planetary mechanism and a power output member for making and breaking the power connection or clutch during the said period of average zero power output.

The invention will be more particularly described with reference to an embodiment thereof set forth in the drawings, in which Fig. 1 is a top plan view, of a device comprising a planetary mechanism, a Geneva gear, a clutch, connecting or latching means between the driving and driven members and means for regulating the engagement of the connecting means, all in a casing which is shown in cross section, Fig. 2 is an elevational view of the device shown in Fig. 1 with a portion of the casing broken away, Fig. 3 is a sectional plan view of the device taken along the line 3—3 of Fig. 2, Fig. 4 is a sectional elevational view taken along the line 4—4 of Fig. 3 showing a latch and its operating cam, Fig. 5 is a partial sectional and partial elevational view taken along the line 5—5 of Fig. 3, Fig. 6 is a partial plan and partial sectional view of a latching device taken along the line 6—6 of Fig. 7, Fig. 7 is an elevational view of a fragment of several parts shown in Fig. 6, illustrating the unlatched position of the members which are shown in latched position in Fig. 4, Fig. 8 is a schematic view illustrating the operation of the latch operating cam, and Fig. 9 is an enlarged perspective view showing the relation of the clutch block, the clutch arm anchor block and the sliding clutch arm which is carried by the slotted output power arm.

Referring to Fig. 1, the device comprises a base 1 which may be mounted on a suitable support. Brackets 2 on the base 1 are journaled for supporting the operating members on frame 1. A casing or cover 4 encloses the operating parts. The power input is through the sprocket wheel 5 which is keyed to the shaft 6. The shaft 6 is journaled near one end in the journal 7 which is carried by bracket 2 and within the revolving hub 8 of the output driven lever 49 (Fig. 3) which is journaled in turn in the main output end bearing 10 at the output end of the device.

The Geneva driving gear 11 is keyed to the shaft 6 and meshes with the gear 12 which is journaled on a stub shaft 13 bolted on the bracket member 2. A Geneva disc operating lever 14 is journaled on stub shaft 13 and is secured to gear 12 by the bolt 15. This lever is extended for mounting the roller 16 at the end on the stub shaft 17 for engaging the slot and cam faces of the four-part Geneva gear 18. The Geneva gear 18 is keyed to the shaft 19 which is mounted to rotate in the journals 20 of the brackets 2. On the shaft 19 is also keyed the latch operating cam 21 which directly actuates the clutch or latch on the power output lever 49 into engaging and disengaging position with the driven slotted lever 40 of the epicycloidal mechanism. The train including the four-part Geneva gear regulates the frequency that the output lever 49 is actuated. The gears 11 and 12 are of equal diameter so that in operation the Geneva gear 18, shaft 19 and cam 21 are rotated one revolution for each four revolutions of the input gear 5, shaft 6 and Geneva driving gear 11.

The planetary unit or mechanism comprises the sun gear 31 pinned to the bracket 2 which meshes with the planet gear 32. The planet gear 32 is keyed to a stub shaft 33 (Fig. 3) which is journaled in the journal 34 at the end of the driving arm 35. The driving arm 35 is keyed to the shaft 6 so that it revolves with shaft 6. The lever 36 is secured to the outer end of stub shaft 33. At the extremity of the lever 36 is fastened a stud 38 upon which is journaled the sliding block 37 which engages the slotted arm 40. The slotted arm 40 is journaled on the main shaft 6. This arm is provided with the slot 41 or longitudinal runway in which the sliding block 37 slides from end to end of the slot 41 as the lever 36 is turned and simultaneously propels the slotted lever 40 through a variable movement controlled by the cycloidal path of the slide block. Engagement is then made and broken with the slotted lever 40 by means of a suitable clutch or latch for producing a variable drive or indexing of the output power lever 49 and the device sought to be driven or indexed.

The engagement and disengagement of the driven member 49 with the slotted arm 40 is made in the present device during a short dwell of the sliding block 37 when the arm 36 is at virtual rest or average zero power output. The latter is accomplished by making the arm 36 longer than the pitch radius of the planet gear 32. By this increase of the arm 36 the path of a point in the axis of the stub shaft 38 is a loop at that point where a cusp otherwise occurs in a cycloidal curve when the radius of arm 36 is made equal to the pitch radius of the planet gear 32. For example, a desirable arrangement comprises making the arm 36 eight-thousandths of an inch longer than the pitch radius of the planet gear 32 for each inch of pitch radius of the planet gear. Each 0.008 of an inch lengthening of the arm per inch of pitch radius produces an arcuate movement of the slotted arm 40 of 0.001 of a radian. While the slotted arm 40 moves 0.001 radian, the arm 35 moves 18°. Therefore the duration of virtual rest or average zero power application to the arm 40 to which an output member is engaged and disengaged is the time required for the arm 35 to turn 18°. A slight backward movement of the slotted arm 40 is produced theoretically when the axis of the stub shaft 38 describes the loop in the epicycloidal path but this presents no difficulty in practice since a slight reversal of the movement of arm 40 does not interfere with the engagement of a clutch with the arm. In large machines where the usual tolerance is provided in the gear train, the negative characteristic is negligible.

Where it is required to stop the driven device only momentarily, the driven member may be connected directly to the arm 40. In such case, the Geneva drive and cam 21 may be omitted. Where, however, an extended dwell is desired in the driven mechanism in order, for example, to provide time for performing other operations on objects borne by a conveyor driven by the output arm 40, a clutch, latch or other form of connector must be provided. For this purpose, an abutment or clutch block 45 on the slotted arm 40 is arranged to engage a clutch, latching member or clutch latch 46 which is movable radially into and out of engagement with the clutch block 45 by means of the Geneva operated cam 21.

The clutch latch 46 is carried by the sliding arm 47 which is mounted to slide radially in a slot 48 in the output power lever 49. The output power lever 49 is integral with the enlarged end of stub shaft 8, and this enlarged end carries an internal bearing in which the shaft 6 is journaled so that the bearing 10 directly supports the short stub shaft 8 and intermediately supports the end of the shaft 6. A cover plate 50 is held in place by screws 51 and retains the sliding arm 47 in the slot so that it can freely move radially. On the outer end of the clutch latch 46, a cam follower or roller 55 is mounted to engage the track of the cam 21. The track of the cam 21 (Figs. 4 and 8) is formed with the track portions 56, 56a, 56b and 56c. The cam is set so that the roller 55 follows the track or groove 56 while the four-part Geneva indexes the cam 21 through three-quarters of a revolution. This retains the clutch latch 46 out of engagement with the clutch block 45. In this position, the latch 46, sliding arm 47 and output power arm 49 are withheld from angular displacement by the clutch latch anchor block 57. In the illustrated embodiment in which gears 11 and 12 are in 1:1 ratio, the clutch block 45 goes into a short dwell each time that the drive sprocket 5 makes a complete revolution. During these dwells of the clutch block 45, the cam 21 is rotated through 90 degrees by the operation of the 4-part Geneva gear. Between the 90° rotations of the Geneva gear, the cam 21 is at rest and roller 55 is positioned at the points A, B, C and D. As long as the roller 55 is in the portion 56 of its track or low part of the cam 21, the arm 47 is drawn outwardly into the notch of the anchor block 57 which is integral with the frame. As the cam 21 rotates and the roller 55 moves in its track from the point A to the point B, it passes over the portion of track 56a and the arm 47 travels inwardly toward the axis of the shaft 6 withdrawing the arm 47 from the anchor block 57. When cam 21 has turned so that the roller 55 has reached the high part 56b of cam 21, or at about the point where the line F (Fig. 8) cuts the cam track, the clutch latch 46 and the clutch block 45 have been brought into full engagement while the roller 55 was passing over the intermediate portion of the cam track between the lines E and F. After the engagement of clutch latch 46 and the clutch block 45, and while the cam dwells, power is applied to the output lever 49 by the rotation of the lever 40 of the cycloidal gear, and lever 49 is rotated through one revolution. After this revolution of lever 49 the Geneva gear again rotates cam 21 through 90 degrees and the roller 55 returns to track 56 over the intermediate track 56c. At this time the arm 47 is again moved outwardly to disengage clutch latch 46 from the clutch block 45 and to again enter the outer end of arm 47 in the notch 58 of anchor block 57.

With this setting of the cam 21 on the shaft 19, the roller 55 traverses the intermediate track portions 56a and 56c during the time that the axis of stud 38 is describing the loops in the cycloidal path which occur during the zero motion of the power output arm 40. As shown in Fig. 8, the track 56b retains the roller 55 in an extreme position in order to maintain engagement of the clutch latch 46 and clutch block 45. Cam 21 is set so that during the time the roller 55 traverses the cam track portion 56a where the power transmission is zero, the slide 47 will be moved radially inward in its slot in the arm 49 so that the clutch latch 46 will be brought into engagement with the clutch block 45 on the arm 40 for indexing the power output arm 49.

While the output power arm 49 is being carried through one revolution of its indexing travel and the clutch is engaged, a holding device is provided to securely retain the clutch latch 46 in engagement with the clutch block 45. This device comprises the circular upright track 67 which is mounted on the bracket member 2 by angle clips 69 and stud bolts 70. When the sliding block 47 and latch 46 are advanced by the cam roller 55 rolling upon the track portion 56b of the cam, the arm 49 is rotated by the arm 40 and the roller 61 rolls over the beveled edge of the circular band or track 67 and along the inside circular surface thereof. The roller 61 is mounted to turn on a pin 62 near the outer end of the sliding member 47 so that the roller 61 will enter smoothly onto the inner peripheral surface of the holding band 67 when the latch 46 is depressed by the cam track 56b into latching or clutching position. The holding ring holds the latch 46 in clutching position and prevents disengagement while the driven arm 49 carrying the sliding member 47 and clutch latch 46 are carried through one revolution of the arm 40. Towards the end of the revolution of the arm 49, the cam 21 is turned by the Geneva disc so that as the roller 61 rides off the other beveled end of the track 67, roller 55 proceeds into the other intermediate portion 56c of the cam track which has been advanced by the operation of Geneva disc 18 into position for receiving the roller 55.

Then during three indexes of the four-part Geneva disc 18, the roller 55 follows the groove 56 and the latch 46 is held out of engagement with the clutch block 45 during this time. The arm 49 and latch 46 are locked in this disengaged position by the notched clutch anchor block 57 so that they cannot turn. The anchor block 57 (Fig. 9) is provided with a notch 58 corresponding to the cross section of the outer end of sliding bar 47 so that the outer end of bar 47 which carries the rollers 55 and 61 will slide into the notch when the sliding bar 47 is drawn into unlatching position as the roller 55 approaches groove 56 through the groove 56c. The anchor block 57 is mounted on the bracket 2 by means of bolts 59 so that the radially sliding bar 47 will enter the notch 58 when the arm 49 and slide 47 are turned by the arm 40 to the unlatching position between the ends of the circular track 67. Then the roller 55 follows the groove 56c of the cam 21 and draws the arm 47 into the notch. The indexed arm 49 is thus positively held from turning while it is disengaged from output lever 40 of the planetary.

Referring to Fig. 8, the roller 55 dwells on cam 21 at the four points A, B, C and D. Between these points, the roller tracks along the cam path by reason of the turning of the cam 21 which is turned by the four-part Geneva gear in the direction indicated by the arrow. During the time that the roller 55 is tracking through the intermediate channel 56a from E to F, the cam 21 is being rotated by the Geneva gear at its maximum speed. During that short interval the arm 40 is at rest and the cam 21 moves roller 55 and sliding arm 47 into clutch engaging position, carrying clutch latch 46 into engagement with the clutch block 45. Then while the arm 49 is being rotated one revolution by the cycloidal arm 40, the arm 47 and clutch latch 46 are prevented by the ring 67 (Fig. 4) from moving to a position where clutch block 45 and clutch latch 46 will disengage. The clutch engaging position of arm 47 is retained by the roller 61 mounted on arm 47 which tracks on the inner surface of ring 67 during the time that clutch block 45 and clutch latch 46 are in engagement. These parts start to disengage as cam 21 turns and the portion 56c of the cam track approaches the roller 55. The ring 67 is discontinuous in the part where arm 47 comes to rest and is in position to be moved radially of the cam 21 and ring 67.

The hub 8 is desirably reduced in diameter to provide a projecting portion 8' to which one member of a coupling 22 is attached for transmitting the variable speed output to a device to be indexed.

It is evident that more or less variation than that illustrated can be made in the relative length of the arm 36 in order to provide more or less time for shifting the clutch block 46. A great variety of variable movements can be provided by varying the relative size of the sun and planet gears, by varying the parting of the Geneva disc 18 and by varying the cam 21. For example, more than one cam track 56, 56a and 56b can be formed in the cam 21 so that the reciprocating bar 47 and latch 46 will engage the clutch block 45 more frequently. Two such cams would cause twice as many engagements. The Geneva gear 18 could be parted 8 times instead of four and produce one half as many engagements of the cam latch without varying other parts of the device. The gear ratio of gears 11 and 12 can be varied and many other modifications can be made. Still another modification may comprise substituting an internally geared ring gear as the sun gear whereby a point in the axis of stub shaft 38 will describe a hypocycloidal instead of the epicycloidal curve described by the same part in the embodiment shown in Figs. 1 to 4. The variable movement of the indexed power output shaft 8' will then correspond to the characteristics of a hypocycloidal curve.

From the foregoing disclosure it will be recognized that the invention is susceptible of modification without departing from the spirit and scope thereof and it is to be understood that the invention is not restricted to the specific illustrations thereof herein set forth.

I claim:

1. A variable speed driving device which comprises a planetary crank gear train having a rotatable drive shaft, a stationary sun gear, a planet gear meshing with the sun gear, a planet driving arm driven by the drive shaft, said driving arm carrying a stub shaft journaled therein and said stub shaft carrying said planet gear and a planet gear lever which are mounted on the stub shaft to turn integrally therewith, said planet gear lever having a radius greater than the pitch radius of the planet gear; a planet gear lever slide block pivotally mounted at the outer end of the planet gear lever; a longitudinally grooved rotatable arm mounted with said slide block in said groove and engaging said arm for rotating the arm in response to the cycloidal movement of the slide block; and means for transmitting the variable speed output of the grooved rotatable arm to a device to be driven.

2. A variable speed driving device comprising a planetary crank gear train having a rotatable drive shaft, a stationary sun gear, a planet gear meshing with the sun gear, a planet driving arm driven by the drive shaft, said driving arm carrying a stub shaft journaled therein and said stub shaft carrying a planet gear and a planet gear lever which are mounted on the stub shaft to turn integrally therewith, said planet gear lever having a radius greater than the pitch radius of the planet gear for effecting a period of average zero power output; a planet-gear lever slide block pivotally mounted at the outer end of the planet gear lever; and a longitudinally grooved rotatable arm mounted with said slide block in said groove and engaging said arm for rotating the arm in response to the cycloidal movement of the slide block; an output power lever; an engaging means for operatively connecting said rotatable arm of the planet crank gear and said output power lever; and means for operating said engaging means into and out of engagement while the said rotatable arm is positioned at zero-power output and said drive shaft is being rotated.

3. A device in accordance with claim 2 in which the sun gear bears external teeth which mesh with the planet gear.

4. A device in accordance with claim 2 in which the sun gear bears internal teeth which mesh with the planet gear.

5. A device in accordance with claim 2 in which the means for operating the engaging means into and out of engagement with the rotatable arm comprises a Geneva gear; a cam shaft to which the Geneva gear is keyed; a rotatable indexing lever for indexing the Geneva gear; a gear train for operatively driving said indexing lever, said gear train being driven from the planetary crank gear drive shaft; a cam driven by said cam shaft; and a cam follower attached to said engaging means, said cam having a release-portion formed to retain the follower and engaging means in a disengaged position during a portion of the indexing of the Geneva gear, an engage-portion formed to retain the follower and engaging means in engaged position during another portion of the indexing of the Geneva gear, and intermediate portions between said release-portion and engage-portion for transferring the follower and engaging means into and out of engaging and disengaging positions, said cam being set so that said intermediate portions are traversible by said follower when the planet-gear lever is positioned at zero-power output.

6. A device in accordance with claim 2 which comprises a member movable radially with respect to the axis of the drive shaft for making engagement between the rotatable power delivery arm and the output power lever; and means for retaining the radially movable member in engaging position while the output power lever is being indexed, said means comprising a stationary cylindrical track having its axis coextensive with the axis of the drive shaft; and a contact member on the radially movable member disposed to abut the cylindrical track during said indexing, said cylindrical track being discontinuous where the radially movable member is moved into engagement and out of engagement with the rotatable power delivery arm.

7. A device in accordance with claim 2 which comprises a member movable radially with respect to the axis of the drive shaft for making engagement between the rotatable power delivery arm and the output power lever; and means for retaining the output power lever from indexing while the radially movable member is in disengaged position, said means comprising a stationary anchor member having an opening therein for receiving an outer end portion of the radially movable member when the same is moved radially to its disengaging position and abutting portions for preventing rotation of the radially movable member on the axis of the output power lever.

EDGAR H. SCHMIDT.

No references cited.